United States Patent [19]

Chisholm

[11] 4,429,312
[45] Jan. 31, 1984

[54] INDEPENDENT LANDING MONITORING SYSTEM

[76] Inventor: John P. Chisholm, P.O. Box 2122, Olympic Valley, Calif. 95730

[21] Appl. No.: 286,312

[22] Filed: Jul. 24, 1981

[51] Int. Cl.$^3$ .............................................. G01S 1/16
[52] U.S. Cl. ................................ 343/410; 343/16 LS
[58] Field of Search ............... 343/6 R, 5 LS, 108 R, 343/16 LS, 125 B

[56] References Cited

U.S. PATENT DOCUMENTS

| | | | |
|---|---|---|---|
| 3,274,592 | 9/1966 | Crane | 343/16 LS |
| 3,945,006 | 3/1976 | Cleeton | 343/6.5 R |
| 4,103,300 | 5/1978 | Gendreu et al. | 343/6 R |

*Primary Examiner*—Sal Cangialosi
*Assistant Examiner*—M. R. Gordon
*Attorney, Agent, or Firm*—Dowell & Dowell

[57] ABSTRACT

An independent landing monitoring system (ILM) for guiding airborne vehicles on final approach to a landing using a ground-based beacon which transmits a sequence of pulse signals including an omnidirectional signal coded to identify its location and used for initial approach, followed by time spaced directionally radiated right/left and up/down signals used for precision guidance along the final approach path. The time spacing of the various beacon signals and their order of succession in the sequence identify the signals, and the relative intensities of paired precision guidance signals as received by the aircraft is used to provide precision indications of the location of the aircraft on the path. The beacon can be either triggered by the weather radar in the aircraft which then receives the beacon signals on its beacon mode receiver, and/or it can be triggered randomly by a noise jittered oscillator in the beacon for use by approaching aircraft equipped only with a beacon receiver but no weather radar.

11 Claims, 7 Drawing Figures

AIRCRAFT RADAR TRANSMITS

BEACON SIGNAL FROM OMNI-ANTENNA 5 SHOULD BE RECEIVED

SIGNAL FROM INDIVIDUAL ANTENNAS SHOULD BE RECEIVED

ANTENNAS 21  22  33  34

|←10→|←10→|←10→|←10→|

A ||| MICROSEC.

|←— 120 MICROSECONDS ≈ 10 MILES —→|

TIME →

|←— 72 MICROSECONDS ≈ 6 MILES —→|

|←— 36 MICROSECONDS ≈ 3 MILES —→|
TIME/RANGE →

FIG. 5.

INDEPENDENT LANDING MONITORING SYSTEM

BACKGROUND AND PRIOR ART

The system which is currently in standard worldwide use for guiding aircraft to a landing is termed ILS (Instrument Landing System). In view of the fact that landing is the most critical procedure encountered in normal flight, numerous attempts have been made to develop a backup, or monitoring system, for ILS. Such systems are termed ILM systems (Independent Landing Monitoring Systems).

The weather radar, either modified or unmodified and cooperating with ground-based reflectors or beacons, has frequently been suggested for implementing an ILM, especially since weather radar is required aboard all airlines for use when flying under bad weather (IFR) conditions. In addition, the weather radar operates at microwave frequencies, thus permitting the generation of narrow, and hence precise, guidance beams with relatively compact antennas.

This concept is taught in my U.S. Pat. No. 3,243,816 which uses the airborne weather radar with ground installed passive reflectors, or alternatively with radar beacons of the frequency shift type, to outline guidance paths for landing, or for landing monitoring purposes.

More recently, Assam in his U.S. Pat. No. 3,729,737 added a further teaching involving the detecting, by means of airborne radar, of plural tilted reflectors to generate glideslope guidance patterns for ILM purposes. Both of the above teachings, however, failed to recognize the problems caused by multipath signals reflected off the ground, which alternately cancel and reinforce the direct path signals from reflectors, thereby making the reflector echoes periodically disappear as viewed from an approaching aircraft.

The importance of this multipath problem has been little understood even by organizations presumably skilled in the art. Recently, for example, the FAA conducted flight tests seeking to detect for guidance purposes ground installed radar reflectors of large radar cross-section, and reported that it was not possible to reliably detect such reflectors since the echoes from the reflectors would alternately appear and disappear. This phenomena was blamed on poor reflectors construction, when in reality it was due to multipath reflections.

Gillard et al in U.S. Pat. No. 4,104,634, recognized the multipath problem and devised a reflector system suitable for ILM and other purposes. This system minimizes the multipath problem by utilizing the ground as an integral portion of each installed reflector.

In my co-pending patent application, Ser. No. 082,512, filed Oct. 9, 1979, I also recognize the multipath problem, and utilize a ground-based passive reflector system to establish a target of known radar cross-section at a known range for use during final approach to calibrate the weather detection and precipitation measuring capability of the radar, the multipath problem being eliminated by having guidance reflectors with vertical directivity adjusted to reject multipath signals reflected from the ground.

However, even though satisfactory solutions to the multipath problem have been found which insure that ground installed radar reflectors will provide targets with large and stable radar cross-sections over well defined angular limits, it is still necessary to be able to reliably distinguish echoes radiated by such installed reflectors from echoes emanating from natural targets, i.e. ground clutter.

In general, the prior art recognizes that echoes from installed passive reflectors can be more easily distinguished from ground clutter if such installed reflectors are arranged with a known spacing, i.e., position encoding, since natural targets do not normally exhibit recognizable coded spacings. In Assam's U.S. Pat. No. 3,729,737, for example, multiple reflectors are arranged with coded spacings along the runway.

The use of passive reflectors results in deficiencies for certain ILM applications, however. A basic disadvantage is caused by the fact that to achieve coding, the reflectors must be physically separated longitudinally along the runway by at least one pulse length, and preferably two. This is necessary so that, as viewed at the radar presentation, successive echoes from such reflectors will be separated in time and will not tend to combine and generate a scintillating target, i.e., a target whose intensity changes radically with minor changes in range of the viewing radar. Although certain modern weather radars of the RCA Primus 500 or Bendix RDR 1400 type have short pulse lengths of 0.5 microsecond, corresponding to a down-range target length of 250 ft., even these short pulse lengths require that four installed guidance reflectors, two each for glideslope and two each for localizer purposes, be separated by an overall longitudinal separation of 1000 ft. to 2000 ft.

While such reflector separation is not a problem at conventional airport runways, it is quite impractical at helicopter landing ports which are limited in area, for example, being of the order of 100 ft. or so in certain applications, e.g., oil rigs or building tops.

This deficiency can be minimized by decreasing the pulse length of the airborne radar, for example, a pulse length of 0.1 microsecond corresponding to a physical length of 50 ft. Such a pulse length is utilized in a Bendix airborne weather radar currently being built for the Coast Guard. Such a pulse length would permit overall reflector separations in an array of reflectors of 200 to 400 ft. A pulse length of 0.05 microsecond, currently in use on marine radars, would permit an overall reduction in reflector separation to 100 to 200 ft.

While such short pulse lengths provide some help in solving the problem of reflector installations at sites of restricted area, their use would require extensive modification of existing radars. It is therefore a preferred approach to devise a method whereby existing production radars, of the RCA Primus 500 or Bendix RD 1400 type for example, can be used virtually unmodified to provide an ILM capability for restricted landing areas.

A weather radar ILM system based on cooperation with active reflectors can be used to solve the problem at physically restricted sites. An active reflector returns energy at a frequency that is different from the radar frequency and hence the active reflector echoes can be distinguished from ground clutter echoes by virtue of suitable frequency change. Multiple active reflectors can be located virtually side by side at a physically restricted site and distinguished by their use of multiple different frequencies.

One such active reflector is shown in my Frequency Shift Reflector (FSR) U.S. Pat. No. 3,108,275 whose use in an ILM system is recognized in my above noted U.S. Pat. No. 3,243,816. In this FSR system, the returned frequency is shifted by a prescribed amount from the incoming frequency by modulation, and the returned energy level is directly related to the incoming energy level. In my U.S. Pat. No. 3,243,816 multiple FSR reflectors, all using the same frequency shift, were utilized. However, the reflectors themselves were individually identified in that patent by longitudinal separation, rather than by frequency separation as discussed above, since the longitudinal separation was indispensible to the guidance method employed.

Another useful active reflector system is a conventional beacon that detects the radar energy at one frequency and is triggered to re-radiate energy at another frequency. In this system the re-radiated energy and frequency are constant, and are not varied according to incoming energy and frequency. The above two mentioned radars, RCA Primus 500 and Bendix RDR 1400, have such a beacon capability provided by a separate receiver that is tuned to the frequency of the ground based beacon which is triggered by the transmitted pulse of the airborne radar. This beacon capability is included in the airborne radar design to facilitate homing on areas such as oil rigs, where such a beacon is installed.

Gendreu et al. in U.S. Pat. No. 4,103,300 suggests the use of a beacon system for ILM purposes. His patent covers two basic techniques. In one technique, the airborne weather radar makes airborne range and angle measurements to one or more beacons for guidance purposes. In the second technique, multiple ground installed beacons with directional antennas radiate signals having known directivity with respect to a guidance path. By comparing the airborne-measured relative intensities of such signals, guidance information is obtained. This is similar to the conventional ILS guidance beams, except that each of Gendreu's radiated lobes is transmitted at a different frequency. This is the way in which his ground based multiple guidance beacons are distinguished both from each other and from ground clutter returns, i.e., by use of multiple different frequencies instead of by their relative time positions in a predetermined sequence of pulses. This technique tends to require complex airborne implementation and wide receiver bandwidths, and cannot use a standard weather radar.

What is desired is an independent landing monitor system or landing system, using active reflectors, that can utilize existing weather radars and associated beacon capability with minimal modification to existing equipment. Such weather radar and beacon capability is inherent in the RCA Primus 500 or Bendix RDR-1400 type radars and can be used as the basis for adding precision landing guidance to the already existing approach guidance with minimal modifications or additions to such radars.

THE INVENTION

The invention is implemented using a standard surface-based weather radar beacon which, when interrogated by an airborne weather radar, replies to such interrogations via a ground-based antenna that is omni-directional in azimuth. The beacon reply is received by the airborne weather radar receiver in beacon mode and displayed on the radar PPI where it is used for approach guidance purposes: that is, to align the airborne vehicle approximately with the final approach and landing guidance path as in present-day practice. This omni beacon reply is coded so as to positively identify that pulse signal as being from the omni antenna, in contrast to subsequent radiations from the beacon's precision guidance antennas, as discussed below.

Having transmitted a reply to the interrogation via an omni-directional antenna, the ground radar beacon next transmits four additional pulses in a prescribed sequence with respect to the pulses radiated from the omni antenna. These four additional pulses are radiated from four directional antennas, two of which are aligned left and right of the centerline of the final approach and landing path, and two of which are aligned above and below the desired glideslope of the final approach and landing path. The alignment of the antennas is such that equal intensity pulsed signals are received from the left/right guidance antennas by the airborne receiver when the vehicle is aligned with the centerline. Similarly, equal intensity pulsed signals are received from the above/below glideslope guidance antennas by the airborne receiver when the vehicle is centered on glideslope.

A processor associated with the weather radar in the vehicle being guided uses these ground-radiated and airborne-received signals to generate precision guidance information as follows:

As a first step, the processor range-tracks the coded signals radiated by the omni antenna. It performs this tracking function for three purposes. First it provides range to touchdown for precision landing guidance purposes. Second, it utilizes these coded signals to set receiver gain in the airborne weather radar via automatic gain control action (AGC) such that only signals radiated from the strong main lobes of the precision guidance antennas are detected for generation of precision guidance data, while the much weaker signals from minor lobes of such guidance antennas, which minor lobes can generate false and hence dangerous guidance courses, are rejected. Third, the process of range tracking the coded omni signals generates a time reference with respect to the reception of such omni signals, which time reference is used to initiate the generation of signals to gate the receiver video output at those times when the signals from the precision guidance antennas are expected to be received in the airborne vehicle.

The gated video output of the receiver is next processed to measure and compare the relative intensities of the left/right and up/down guidance pulses. The comparison data is used to generate guidance data for driving left/right and up/down guidance displays, such as used in current ILS guidance practice. The pilot is then able to use such data to precisely align the airborne vehicle with the desired final approach and landing path.

In certain applications, it may not be possible to install a complete weather radar in the airborne vehicle, due to size restrictions especially with regard to the installation of a weather radar scanning antenna. However, it is still possible to achieve a precision guidance capability by installing a radar R/T unit with a much more compact forward-looking fixed airborne antenna. Without a scanning antenna, the operation would be identical except that approach navigation would have to be accomplished by another method, such as using an existing VORTAC facility or NDB facility, since the approach guidance capability usually provided by scanning of an airborne weather radar would not be available.

In a further simplification, only an airborne receiver capable of receiving the ground installed radar beacon signals would be required. In this case, it would be necessary to have the surface-based radar beacon radiate guidance pulses without the necessity of being interrogated by an airborne weather radar. This can be accomplished by having the radar beacon randomly triggered by an internal oscillator in addition to being triggered by an airborne radar interrogation. This oscillator would be noise jittered so that such radiations would be asynchronous with any airborne interrogators. This is the procedure followed in present-day DME practice wherein the DME ground stations will respond to airborne interrogations, but are also being triggered by a noise jittered oscillator.

In such a minimally equipped vehicle, the beacon receiver receives the radar beacon transmissions as before. The vehicle's airborne processor recognizes the coded signals from the omni-antenna as before, and utilizes the arrival of these coded signals to generate video gates for the sequencing of the precision guidance data so that the precision guidance video pulses can be measured in amplitude and compared for the generation of precision guidance displays.

In this minimal system, only precision lateral and vertical guidance data is available and range to touchdown is not available for landing guidance purposes. This is similar to present day ILS installations where range to touchdown is not provided by the ILS system but is provided, if required, by DME or marker beacon facilities. Similar techniques can be employed in the presently described precision guidance system.

OBJECTS AND ADVANTAGES

The basic advantage of the invention is the extreme simplicity of the system in contrast to existing ILS or MLS systems. A further advantage is its use of standard weather radar and/or weather radar airborne beacon receivers, cooperating with ground based weather radar beacons, it being only necessary to add easily implemented signal tracking and amplitude comparison circuits to the airborne weather radar or airborne beacon receiver for guidance generation purposes. The basic ground beacon is also a standard unit currently employed with weather radars for navigating, to oil rigs for example, and requires only the addition of time pulse sequencing circuitry. The antennas utilized and the associated switch that sequentially connects them to the beacon are all well known and standard items.

A further advantage of the invention is that it is directly compatible with ILM systems using passive ground guidance reflectors, in which the encoding of echoes from the reflectors is established by their physical separations which determine the time sequence in which they occur, guidance data being also based on comparisons of signal intensities received from the paired guidance patterns. The airborne range tracking and guidance generation circuitry is identical for both passive and active reflector ILM systems.

A further advantage of the invention is that a precision guidance final approach and landing capability is added to an existing enroute and approach capability, without impairing that existing approach capability. This is very significant in that the existing weather radar approach capability, using radar beacons, has an assigned frequency allocation, and hence the precision capability can utilize such assigned frequency allocation without the necessity of allocating an additional frequency band.

PREFERRED EMBODIMENT

Figure 1:
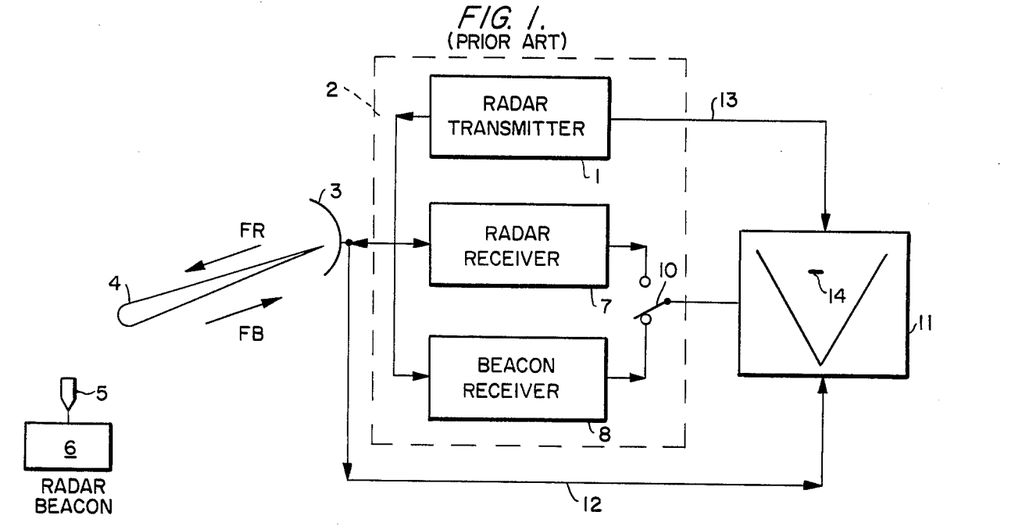
FIG. 1 is a block diagram of an airborne standard weather radar with beacon capability interrogating a round based beacon.
Figure 2:
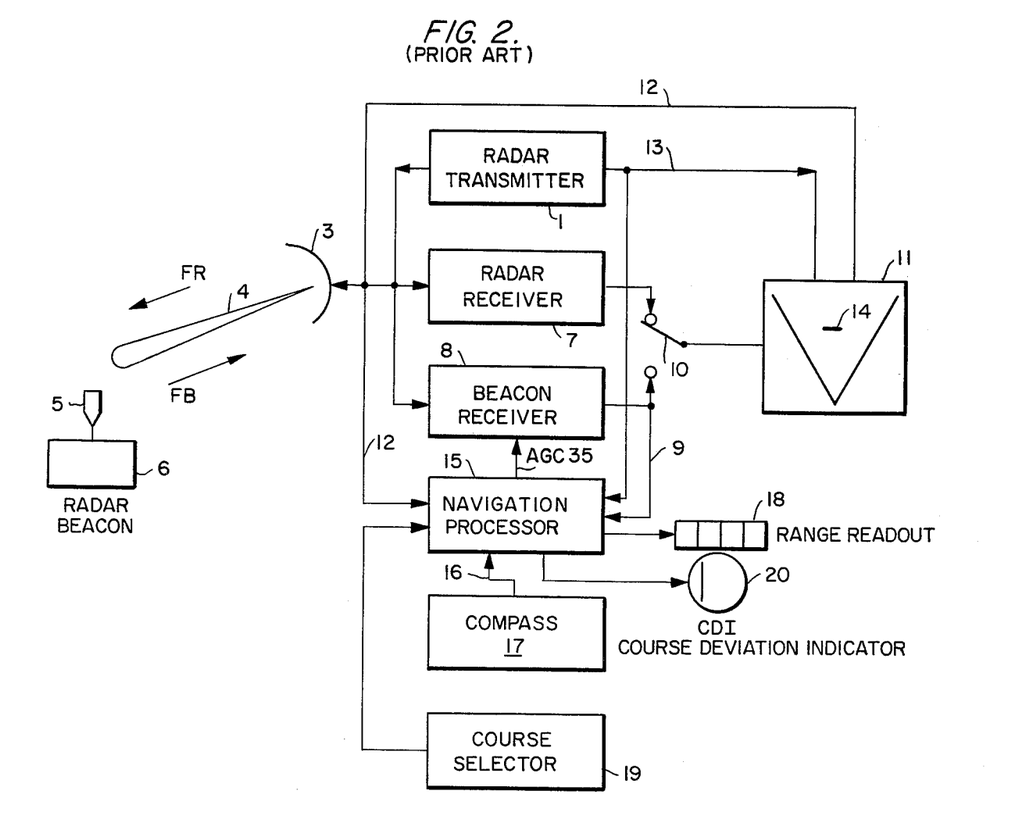
FIG. 2 is a block diagram of a standard weather radar with beacon capability interrogating a ground based beacon, the weather radar having circuitry for range and angle tracking the beacon and for combining this data with heading information and having outputs for displaying range and bearing to the beacon.
Figure 3:
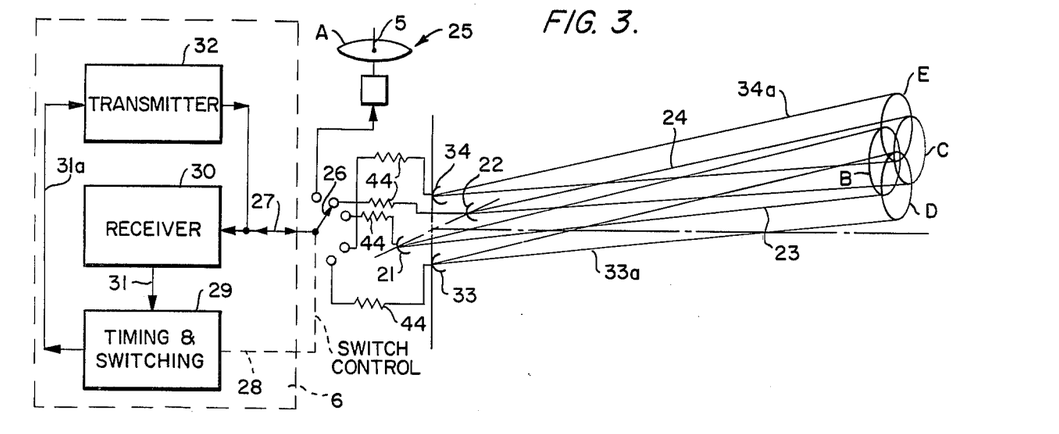
FIG. 3 is a diagram of a ground beacon augmented to include precision localizer and glideslope antennas in addition to its non-directional antenna, and further provided with antenna switching and timing circuits for sequentially radiating beacon pulses from the respective omni-directional and precision guidance antennas.

The description of the preferred embodiment is preceded by a description of a conventional weather radar operating with a conventional beacon, as shown in FIG. 1. Circuitry is then added to provide enhanced guidance approach data that permits improved approach navigation to the general vicinity of the landing area, as shown in FIG. 2. This circuitry is then modified to generate the precision landing guidance capability of the invention, as shown in FIGS. 3, 4 and 5.

FIG. 1 shows in a block diagram the current use of an existing weather radar beacon system, as exemplified by the RCA primus 500 airborne radar and by a Vega Precision Model 376X beacon. Conventional weather radar precipitation detection and display techniques are well known and will not be detailed herein. The conventional beacon system operates as follows: The airborne radar transmitter 1 within receiver/transmitter unit 2, generates a pulse of energy at frequency FR. This energy is radiated using a directive scanning antenna 3. Periodically the directive beam 4 scans the non-directional beacon antenna 5 and the radar signal is thus received and detected by the receiver in the radar beacon 6. This detected signal is used to trigger a beacon reply at beacon frequency FB which is radiated by beacon antenna 5 and is received at the airborne radar antenna 3. This signal enters the R/T unit 2 where it is detected by the radar's beacon mode receiver 8.

The output of the beacon receiver 8 is connected to radar indicator 11 via selector switch 10, which is used to select for display either direct radar echoes from a target, or frequency shifted beacon replies. Antenna scan angle data 12 and the transmitter trigger 13 are also connected to indicator 11 so that the beacon reply 14 will be displayed in its proper angle and range orientation on indicator screen 11. The pilot uses such a display of beacon returns for nonprecision approach navigation to the beacon location as in current practice, the weather radar display providing a map-like presentation of the beacon location with respect to the aircraft. Moreover, it is possible to use the radar to generate more conventional navigational types of displays, such as direct indications of the range and bearing to the beacon which navigational displays permit more accurate approach navigation.

While such a more conventional guidance display is not required for approach guidance purposes, the circuitry used to implement such a display is a first step in implementing the airborne precision guidance capability and hence is discussed below.

As a next step thereof, as shown in FIG. 2, signals corresponding to the range and bearing of the beacon with respect to the aircraft are extracted from the radar system and used to generate guidance signals which can be used to activate conventional guidance displays which can be utilized by the pilot to navigate the aircraft to the beacon location, i.e., toward the landing area, in a non-precision navigational mode.

In FIG. 2 for conventional beacon operation, the radar R/T units transmitter 11 transmits a pulse FR that is received by the beacon 6 and detected. A reply pulse FB is radiated by the beacon 6 and then received by the airborne beacon receiver 8 and detected and displayed at indicator 11 as signal 14.

In more modern beacons, the reply consists of a group of pulses, in a preassigned code, which code identifies the specific beacon being interrogated for landing area identity purposes. In the embodiment discussed below, a coded pulse group is employed providing landing area location identity as well as identifying these pulses as being radiated by the omni antenna for purposes of establishing the radiating sequence of pulses from the precision guidance ground antennas, discussed hereinafter.

In addition, a navigation processor 15 connected to the airborne radar has the following inputs: antenna scan angle data 12, aircraft heading 16 from a compass 17, beacon video 9, and transmitter trigger 13. The processor utilizes these inputs to track the beacon video signal 9 as to range and bearing angle, i.e., the angle of the antenna with respect to the aircraft fuselage.

In addition, the airborne processor uses these beacon replies to set an AGC level on line 35 to ensure that the beacon replies are within the linear dynamic range of the beacon receiver. This feature is important for the recognition of precision guidance signals and for the airborne generation of precision guidance data as detailed later.

These beacon range and angle tracking techniques are well established and utilized in the prior art. They are termed "track-while-scan" referring to the fact that beacon returns are range and angle tracked while the antenna is scanning. The most widely implemented system using such track while scan technique is the FAA Air Traffic Control Radar Beacon System (ATCRBS), whereby beacons in aircraft are tracked by ground-based radars to determine aircraft location for air traffic control purposes. These ATCRBS beacons are tracked while the observing antenna is continuously scanning through 360°.

The processor 15 in FIG. 2 outputs the range of the aircraft with respect to the beacon to a range display indicator 18.

The processor also combines the antenna angle of the beacon reply with respect to the fuselage, with the heading of the fuselage as provided by compass 17 to provide the bearing of the beacon location relative to the aircraft. This bearing data is compared with a manually preset course that it is desired to fly to the beacon, as set by a course selector 19, and the difference between actual course being flown and desired course is displayed on a course deviation indicator CDI 20. The pilot is thus provided with conventional navigational displays, i.e., range and bearings to fly to the beacon, such as a beacon at a helicopter landing location.

The accuracy of such guidance is similar to the accuracy provided by a conventional VOR/DME range and angle bearing navigational system and as such is appropriate for non-precision approach to an airport. A system using the technique of FIG. 2 has been built by Cooper Avionics, Montara, CA.

For precision approaches, to very low landing minimums, precision vertical and lateral guidance data such as that provided by the existing ILS system is required. The present invention teaches a novel ground-based technique for providing such data using a weather radar system as shown in FIG. 3. For the case of lateral guidance, the ground beacon has been provided with two directive antennas 21 and 22 having precision guidance antenna lobe patterns 23 and 24, the directive antennas being in addition to a non-directive antenna 5 with omni-directional antenna pattern 25. All of these antennas are connected to the beacon 6 via switch 26 and antenna cable 27.

In a similar manner for the case where vertical guidance is also desired, the ground beacon is provided with two directive antennas 33 and 34 having precision guidance lobes 33a and 34a, all connected to the beacon via switch 26 and antenna cable 27.

Directive antenna patterns 23 and 24 are aligned and partly overlapped so that they provide equal intensity signals along the extended centerline of the runway, whereby if the signal intensities from both antennas are equal in the airborne vehicle, the vehicle is on course horizontally. Likewise, the directive antenna patterns 33a and 34a are aligned with the glideslope and somewhat overlapped. If their signal intensities are equal in the airborne vehicle, the vehicle is on course vertically. While the antenna beams are shown as being conical, other beam contours can be utilized such as contours that provide wider azimuth coverage than vertical, always assuming that the paired beams overlap and provide signals of equal intensity along the desired horizontal and vertical guidance paths.

Switch 26 is activated by switch control line 28, that is in turn controlled by timing and switching circuitry 29 which is connected to the beacon receiver 30 output line 31. This switching and timing circuitry operates to leave omnidirectional antenna 5 connected to the beacon antenna line 27 except after receipt and detection of an interrogating pulse from an airborne radar. However, after receipt and detection of an interrogating pulse from the airborne weather radar, the switching and timing circuitry performs the following sequence of functions: While the omni-directional antenna 5 is still connected, the beacon transmitter is triggered by the switching and timing circuits via line 31a in reply to the radar interrogation, which reply is used at the airborne radar as a ranging pulse. This reply from the omni antenna consists of a coded group of pulses A, FIG. 4, for station location identity purposes, as well as for positively establishing the radiating sequence from the precision guidance antennas. After the coded identity group A is radiated from the omni antenna, the switching circuitry 26 and 29 then switches the beacon output to the first directive antenna 21 and triggers the transmission of a first localizer pulse B. This transmission occurs at a known and preset time delay after the radiation of the identity code from the omni antenna. A nominal time delay is 10 microseconds. Modern solid state switches of the HP Model 33016C type can accomplish such switching in a fraction of a microsecond. After a similar fixed delay, the switching circuitry switches the beacon output to the next directive antenna 22 and initiates the transmission of the other horizontal localizer pulse C, these two localizer pulses going out on overlapping lobes 23 and 24 to the aircraft. After another similar fixed delay, the switch 26 connects the first vertical antenna 33 to the beacon and initiates the transmission of a pulse D in the lobe 33a. After another similar fixed delay the switch 26 connects the other vertical antenna 34 to the beacon and initiates the transmission of a pulse E in the lobe 34a, which overlaps partially with the lobe 33a, the pulses D and E being used in the aircraft to determine the vertical position of the aircraft along the glidepath. As soon as this last pulse E has been transmitted, the switch reconnects the omni antenna 5 to the beacon 6 and remains there until another interrogating pulse from an air-borne weather radar has been received to restart the cycle. These four precision guidance pulses are identifiable by their relative timing with respect to the identify code pulse group A transmitted over the omni antenna in reply to the radar interrogation, which identity code group is range tracked in the airborne weather radar processor.

In the aircraft, these four radiated precision guidance pulses B, C, D and E, plus the pulse group A from the omni antenna are received within the scanning pattern 4 of the antenna 3. These received signals are detected by beacon receiver 8 and the resulting beacon video signals 9 are fed to processor 15. In this embodiment the first and second guidance pulses B and C following the pulse coded group A comprise a horizontal localizer pair, and the third and fourth pulses D and E are the vertical glideslope pair.

The spacing between such paired pulses is not critical in that they could be separated by several microseconds, or even several hundreds or microseconds. While one possibility is to have the pulse spacings consistent with the spacings generated by passive reflectors installed for similar guidance generation purposes, such passive reflector spacings would vary from airport to airport and hence would have to be compensated by information stored in or inserted in the airborne processor. In a similar manner, the airborne processor could recognize the difference between a passive and an active reflector system, as well as the spacings between pulses in the different reflector systems. For the sake of discussion, a pulse spacing of 10 microseconds between pulses has been assumed.

The signals and the signal levels of the beacon replies that appear on video signal line 9 in the airborne radar are determined by the following factors:

First, in order for the beacon 6 to generate a reply pulse to the airborne radar, it must receive an adequately strong interrogating signal from the radar. In order for this to happen, antenna beam 4 must be directed at beacon antenna 5 during the airborne antenna 3 scanning cycle.

When this occurs, and the aircraft is sufficiently close, the beacon 6 will generate a train of pulses consisting of the identity pulse group A, plus two additional pulses B and C if only lateral guidance is provided, or four additional pulses B, C and D, E in the case of both vertical and lateral guidance. The pulse group A of any triggered pulse train, FIGS. 3 and 4, will be radiated from the beacon by omnidirectional beacon antenna 5 and hence will generally be received by the airborne radar, since the radar frequency path performance from the beacon transmitter to the airborne receiver is fairly well matched to that from the airborne transmitter to the beacon receiver. In other words, if the airborne transmitter can trigger the beacon receiver, the beacon transmitter can generally be detected by the airborne beacon receiver.

The first and second pulses B and C of the beacon pulse train following the transmission of the identity pulse group A form a pair which will be radiated respectively by the paired horizontal guidance antenna 21 and the other horizontal guidance antenna 22. These pulses B and C will not necessarily be detected by airborne beacon receiver 8 since the airborne vehicle may not initially be near the centerline of the horizontal approach path and therefore within the relatively narrow beams of the precision guidance antennas 21 and 22. This is also true for the third and fourth pulses D and E following the identity pulse group A and comprising the vertical guidance pair.

The energy from the omni-directional antenna in the coverage area of interest is further used to control the receiver gain via AGC line 35, FIG. 2, so that only signals approximately equal in intensity to those radiated by the omni-directional antenna will be linearly detected and processed for the generation of precision guidance data.

In addition, it should be noted that the precision guidance antennas have attenuators 44 inserted in their input lines so that the radiated energy in their main lobes equals the energy in the omni antenna pattern within the coverage area of interest. This is to ensure that the side lobes of the high gain precision guidance antennas do not radiate signals of sufficient intensity to be detected and processed and hence possibly generate false courses.

The nonprecision guidance navigational capability provided by the beacon 6 radiating via nondirective beacon antenna 5 will eventually permit navigation with an accuracy such that the aircraft will be approximately aligned with the horizontal and vertical approach paths, whereupon the pulse signals B, C, D and E radiated by precision guidance antennas 21, 22, 33 and 34 will be detected by the airborne beacon receiver 8, the detected signals then being processed for the generation of precision guidance data.

The technique for generation of the precision guidance data in the airborne unit is discussed below with reference to FIGS. 4 and 5. Initially, when the aircraft is remote from the horizontal and vertical approach paths, the navigation processor 15 of FIG. 2 operating in a non-precision mode will range and angle track the beacon reply transmitted by the omni-directional antenna 5. This means that on successive radar antenna scans, the processor 15 will range and angle gate the beacon video signal to isolate the omni-directional beacon return signal A radiated from the antenna 5. Probably no others of the pulses B, C, D or E will be received because the aircraft is remote from the horizontal and vertical precision approach paths.

As a next step, the navigation processor 15, which is range and angle tracking the beacon signal A from omni antenna 15, is used to generate signals that will open a gate to pass the video signal pulses only at those times when the four precision guidance signals B, C, D and E are expected to arrive at the aircraft, assuming that the airborne vehicle is within the patterns of the precision guidance beacons. Depending on the location of the airborne vehicle, all, some, or none of the precision guidance signals may appear at the output of the gated video line. FIG. 4 depicts some of the possible signal configurations for different locations of the aircraft relative to the glideslope and horizontal approach path.

Figures 4A, 4B, 4C:
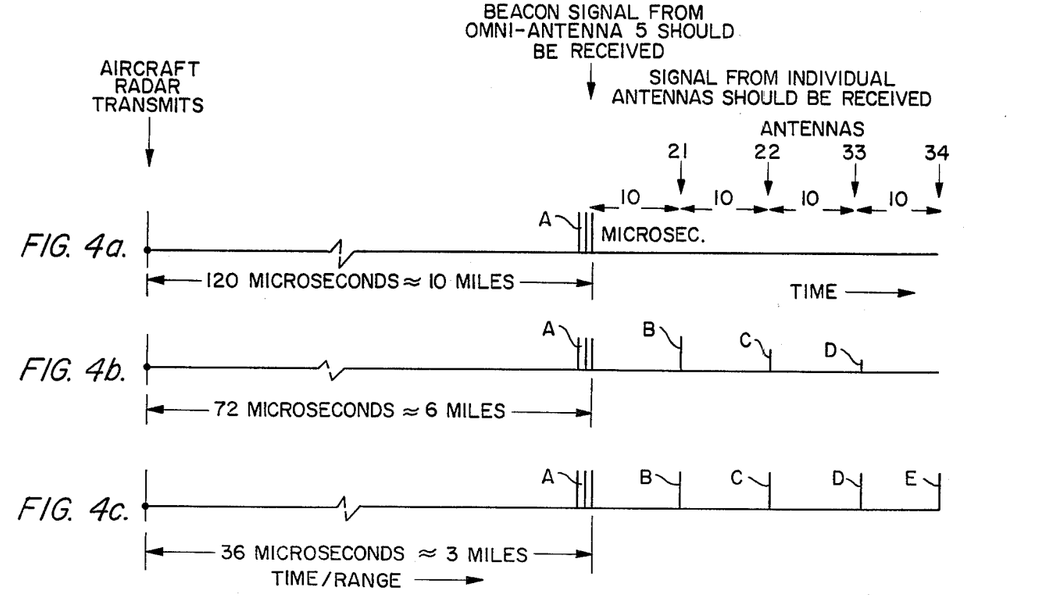
FIGS. 4a, 4b and 4c graphically illustrate the relative magnitudes of pulses received by the airborne weather radar for various different locations of the aircraft carrying the weather radar.
Figure 5:
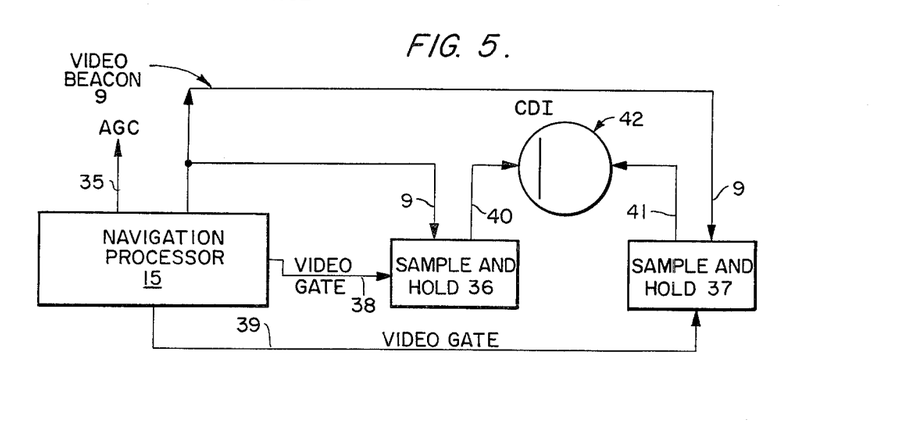
FIG. 5 is a block diagram of a system for comparing the relative magnitudes of pulses received by the airborne radar from different beacon antennas for purposes of generating and displaying precision guidance data.

FIG. 4a represents the case where the aircraft is at a range of ten miles, corresponding to a round trip propagation time of 120 microseconds, and at an altitude of one thousand fee, but considerably left of the glidepath centerline. In this case, the aircraft is below the precision glideslope beams and outside the azimuth coverage of the precision lateral guidance beams, and therefore the only signal received is the pulse group A from the omni beacon antenna 5.

FIG. 4b represents the case where the airborne vehicle is at a range of 6 miles still at an altitude of 1,000 ft., and somewhat left of centerline. In this case, both the left and right lateral guidance signals B and C from antennas 21 and 22 are detected but with different amplitude intensities, and the lower vertical guidance signal D from antenna 33 is detected. These three signals are shown in FIG. 4 as arriving in sequence, spaced 10 microseconds apart, based upon a similar pulse sequence generated at the beacon 6 by switching and timing circuits 29, FIG. 3.

FIG. 4c represents the case where the aircraft is on the horizontal approach path centerline, and on the correct glideslope, at a range of three miles. In this case, pulse group A and all pulses B, C, D and E are detected, and they all have similar intensities. Specifically, B and C are equal to each other, D and E are equal to each other, and A, B, C, D and E are of similar intensity. The purpose of having the signals adjusted to similar intensity by the AGC is to ensure that they will all fall within the linear dynamic range of the receiver. In order to achieve this similar intensity with a beacon that generates transmitted pulses of equal intensity, but radiates them via antennas of greatly different gain, and different angular coverage, it is necessary to utilize the attenuators 44 in the feed lines of the directive antennas, as discussed previously. For example, assuming the horizontal guidance antennas have a horizontal beamwidth of 10° and a vertical beamwidth of 10°, the gain of such antennas is 24 db. Assuming the vertical guidance antennas have a vertical beamwidth of 2.5° and a horizontal beamwidth of 2.5°, their gain is 30 db. Assuming that the omni-directional antenna has omni-directional azimuth coverage but the restricted coverage in the vertical provides about 12 db gain, it is thus necessary to insert a 12 db attenuator in the feed lines to the horizontal precision antennas and an 18 db attenuator in the feed lines to the vertical precision antennas.

In the aircraft the navigation processor 15 can readily compare the intensities of the signals B and C received from antennas 21 and 22 for lateral guidance generation, and compare the intensities of the signals D and E received from antennas 33 and 34 for vertical guidance purposes. This can be done as shown in FIG. 5 which depicts the lateral case. The system is the same for vertical glideslope guidance.

In FIG. 5 the beacon video 9, comprising received and detected signals B and C, is fed to two sample and hold circuits 36 and 37. Also fed to those sample and hold circuits are video gates 38 and 39 from the navigation processor 15. These video gates are used to trigger the sample and hold circuits at the times of expected arrival of signals B and C from precision lateral guidance antennas 21 and 22. The sample and hold circuits measure and store the respective intensities of these two signals and deliver output voltages corresponding to such signal strengths on lines 40 and 41. These voltages are inputted into the CDI crosspointer indicator 42, which indicates the relative strengths of such signals for use by the pilot in a manner well known in the prior art. When the signals are equal, for example, the aircraft is on the horizontal approach path centerline.

In a similar manner, sample and hold circuits and video gating signals are used to indicate position with respect to the vertical glideslope.

It should be noted that while radar beacons of the type described herein, the Vega Precision Model 367X for example, need normally radiate only a single reply pulse for nonprecision navigation purposes, the more modern versions of such beacons radiate multiple pulses, in a code to provide landing area identity. The more modern airborne weather radars with beacon capability such as the Bendix RDR-1400 A, have associated decoding circuits that will decode the coded beacon reply and display code identity in alpha numerics on the weather radar display to identify the landing area. Moreover, the use of such coded beacons for non-precision navigation does not preclude their use for precision guidance purposes since radiating the identity code from the beacon omni antenna identifies that portion of the radiated signal as being for non-precision guidance purposes as well as providing landing area identity.

It should also be noted that, while the above embodiment utilizes an airborne radar with a scanning antenna, similar precision guidance can be obtained using a fixed forward-looking broader-pattern airborne antenna since precison guidance is derived entirely from the ratio of signals received from surface-based directive antennas. On this basis, precision guidance can be obtained by the use of an airborne interrogator and receiver with an associated fixed antenna and appropriate range tracking and processing circuitry, i.e, without the use of a full airborne weather radar and scanning antenna.

As a further alternative, the airborne equipment need not even contain an interrogator, but merely a receiver. In this embodiment, the ground beacon need only randomly transmit its sequence of pulses A, B, C, D and E which pulses are still in the fixed sequence within the pulse group which includes both the non-directional and directional radiations. These sequences can be radiated at random spaced intervals, and would be in addition to sequences transmitted in response to interrogating radar signals. In this respect, the beacon operation would be similar to that of a conventional TACAN/DME beacon system wherein random transmissions provide azimuth guidance information by virtue of their modulation by a rotating antenna, while other transmissions in response to specific interrogations provide distance information. In the present system the airborne receiver would receive these sequences of pulses, and with knowledge of the order in which they occur, i.e., station identity from the omni antenna, followed by localizer type and then glideslope type guidance, the airborne circuitry would extract left/right and up/down precision guidance. In such a simplified embodiment, operation is quite similar to that of a conventional ILS system, which system does not itself provide range information, such range information being normally provided, for landing purposes by a co-located FAA type DME system.

It is apparent, therefore, that the present invention can be implemented in varying degrees of airborne complexity, so that those aircraft not equipped with a weather radar will be able to add the precision guidance capability at minimum cost and complexity.

Referring to the ground installation, the lateral and vertical guidance antennas need not be separate antennas but may consist of one shaped reflector with, for example, four separate feeds that are sequentially switched to the beacon transmitter. Alternatively, two shaped reflectors could be used, each with two separate feeds respectively for lateral and vertical guidance purposes, such feeds being sequentially switched to the beacon transmitter.

As an alternate embodiment, where the ILM localizer and glide-slope antennas may be widely separated as in current-day ILS practice, it might even be desirable to utilize separate beacons with a first beacon sequentially radiating, for example, from an omni antenna, and then from left and right guidance antennas; and with a second beacon subsequently radiating from up/down guidance antennas. In such an embodiment, the beacon radiating sequence would have to allow for the physical separation of the antennas. Alternately, 5 separate transmitters, individually connected to separate antennas could be used in place of one transmitter switched to the separate antennas.

In addition, it should be noted that radiation from the omni antenna is not required provided the radiations from the precision guidance antennas are positively identified, as by a code or sequence. However, care should be taken to ensure the false courses caused by minor lobes cannot cause a problem, for example, by ensuring that the airborne vehicle is within the main precision guidance pattern by virtue of the accuracy of the approach aid used prior to the precision guidance.

This invention is not to be limited to the exact embodiments shown and described, since changes may be made within the scope of the following claims.

I claim:

1. A guidance system for airborne vehicles on a final approach landing path, comprising
   (a) ground-based means having transmitter means operative to deliver pulse sequences, each sequence comprising multiple guidance pulse signals having predetermined time spacings, and the sequences occurring at spaced time intervals;
   (b) said ground-based means having antenna means including plural directional radiating means directed to radiate signals upwardly along and adjacent to the final approach landing path, the radiating means being arranged in pairs operative to radiate paired guidance signals with respect to the landing path;
   (c) said ground-based means having pulse signal timing and switching means coupled to trigger the transmitter means and to connect it to the antenna means, the timing and switching means being operative to couple a different directional radiating means to the transmitter means to radiate each successive guidance pulse signal in a sequence of pulse signals, thereby to identify the directional radiating means in accordance with the time position in the sequence of the guidance pulse signal which it radiates;
   (d) airborne means having receiver means operative to receive and detect the radiated pulse signals in the sequence;
   (e) said airborne means having indicator means having means for indicating the degree of deviation of the vehicle from the landing path; and
   (f) said airborne means having pulse processor means responsive to the received pulse signals and to their time positions in the sequence and operative to pair the received pulse signals and to compare the intensities of the pulse signals from each pair of directional radiating means and to deliver to the indicator means output signals representing the relative intensities of the respective paired pulse signals to control said means for indicating deviation from the landing path.

2. A guidance system as claimed in claim 1, wherein said antenna means include paired localizer radiating means directed on horizontally opposite sides of the landing path and include paired glideslope radiating means directed above and below the landing path, and said pulse timing means initiating in each sequence guidance pulse signals radiating sequentially from the respective paired localizer and glideslope radiating means.

3. A guidance system as claimed in claim 1, wherein said ground-based means comprises beacon means which includes a receiver, and said airborne means further includes an interrogator transmitter to which the beacon receiver is tuned, and the beacon transmitter means being triggered through the receiver by the airborne transmitter to radiate said sequence of multiple time-spaced pulse signals.

4. A guidance system as claimed in claim 3, wherein said airborne receiver means and interrogator transmitter comprise portions of an airborne weather radar.

5. A guidance system as claimed in claim 1, wherein said ground-based antenna means includes an omnidirectional antenna, and said pulse timing means is operative to cause the transmitter means to radiate a reference pulse signal from said omnidirectional antenna, and wherein said airborne processor means is operative upon receipt of the radiated reference pulse signal to develop a signal representing the level of the reference pulse signal, and means to compare the levels of the pulse signals from the directional radiating means to said reference pulse signal level and reject directional radiating means pulse signals of significantly lesser intensities.

6. A guidance system as claimed in claim 5, wherein at least some of said radiated pulse signals are encoded for identification purposes.

7. A guidance system as claimed in claim 5, wherein said ground-based means comprises beacon means which includes a receiver, and said airborne means includes an interrogator transmitter to which the beacon receiver is turned, the beacon transmitter means being triggered through the receiver by the airborne transmitter to radiate said sequence of spaced pulse signals, and said airborne means including means for measuring range to the beacon means based on the time of arrival of the reference pulse signals therefrom.

8. A guidance system as claimed in claim 7, wherein the airborne receiver means and interrogator transmitter comprise portions of an airborne weather radar, the radar having a scanning antenna and having track-while-scan means operative to track the beacon reference pulse signals, the airborne means being operative to provide output based thereon to the indicator means for nonprecision navigation toward the beacon means.

9. A guidance system as claimed in claim 7, wherein said ground-based antenna means include paired localizer radiating means directed on horizontally opposite sides of the centerline of the landing path, and include paired glideslope radiating means directed above and below the landing path, and the paired radiating means having patterns which partially overlap along the centerline of the landing path, and said pulse timing means initiating in each sequence pulse signals to radiate sequentially from the omnidirectional antenna and from the respective paired localizer and glideslope radiating means.

10. A guidance system as claimed in claim 1, in which the ground-based transmitter means comprises a single transmitted that is sequentially connected to the radiating means means via switch means which is controlled by the pulse timing means.

11. A guidance system as claimed in claim 1, in which the pulse sequence from the ground-based transmitter means, and the gain and directional orientation of the radiating means are selected such that the desired landing path is defined by reception of equal intensity pulse signals from the paired radiating means.

* * * * *